(12) United States Patent
Borkar

(10) Patent No.: US 11,128,581 B2
(45) Date of Patent: *Sep. 21, 2021

(54) SECURE MESSAGING BETWEEN COMPUTING COMPONENTS

(71) Applicant: SAP SE, Walldorf (DE)

(72) Inventor: Shailesh Borkar, Gondia (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,796

(22) Filed: Dec. 2, 2019

(65) Prior Publication Data

US 2020/0106724 A1 Apr. 2, 2020

Related U.S. Application Data

(63) Continuation of application No. 15/365,312, filed on Nov. 30, 2016, now Pat. No. 10,516,631.

(51) Int. Cl.
*G06F 15/16* (2006.01)
*H04L 12/58* (2006.01)
*H04L 29/06* (2006.01)

(52) U.S. Cl.
CPC .............. *H04L 51/04* (2013.01); *H04L 51/18* (2013.01); *H04L 63/0428* (2013.01)

(58) Field of Classification Search
CPC ...... H04L 51/04; H04L 63/0428; H04L 51/18
See application file for complete search history.

(56) References Cited

U.S. PATENT DOCUMENTS

| 6,563,441 | B1 | 5/2003 | Gold |
| 10,516,631 | B2* | 12/2019 | Borkar ............... H04L 63/0428 |
| 2011/0246503 | A1 | 10/2011 | Bender et al. |
| 2013/0173248 | A1 | 7/2013 | Curzi et al. |
| 2016/0087796 | A1 | 3/2016 | Lucamarini et al. |
| 2018/0152398 | A1 | 5/2018 | Borkar |

OTHER PUBLICATIONS

"U.S. Appl. No. 15/365,312, Non Final Office Action dated Jan. 9, 2019", 10 pgs.
"U.S. Appl. No. 15/365,312, Notice of Allowance dated May 8, 2019", 5 pgs.
"U.S. Appl. No. 15/365,312, Notice of Allowance dated Aug. 16, 2019", 5 pgs.
"U.S. Appl. No. 15/365,312, Response filed Apr. 16, 2019 to Non Final Office Action dated Jan. 9, 2019", 13 pgs.

(Continued)

*Primary Examiner* — John B Walsh
(74) *Attorney, Agent, or Firm* — Schwegman Lundberg & Woessner, P.A.

(57) ABSTRACT

Various examples are directed to systems and methods for secure messaging between computing components. A first computing device may send tree generation data to a second computing component. The tree generation data may comprise string selection data identifying a set of at least two strings of a string library. The first computing component may generate a coding tree based at least in part on the tree generation data and the string library and encode a first message based at least in part on the coding tree to generate a first encoded message. The first computing component may send the first encoded message to the second computing component.

20 Claims, 9 Drawing Sheets

(56) References Cited

OTHER PUBLICATIONS

McCreight, Edward, "A Space-Economical Suffix Tree Construction Algorithm", Journal of the ACM, vol. 23, No. 2, (1976), 262-272.
Morrison, Donald, "PATRICIA—Practical Algorithm to Retrieve Information Coded in Alphanumeric", Journal of the ACM, vol. 15, Issue 4 (Oct. 1968), 514-534.
Moura, Lucia, "Algorithms in Bioinformatics: Lecture 09: Su?x Trees and Variants", (2010), 10 pgs.
Ukkonen, Esko, "On-line Construction of Suffix Trees", Journal of Algorithmica, vol. 14, Iss. 3, (Sep. 1995), 18 pgs.

\* cited by examiner

SECURE MESSAGING BETWEEN COMPUTING COMPONENTS

CROSS-REFERENCE TO RELATED APPLICATIONS

This application is a continuation of prior application Ser. No. 15/365,312, filed on Nov. 30, 2016, which is incorporated by reference herein in its entirety.

TECHNICAL FIELD

This document generally relates to methods and systems for use with computer networks. More particularly, this document relates to secure messaging between computing components.

BACKGROUND

Computing components, such as computing devices, applications, and other software, send messages to one another. There is often a need to prevent the messages from being read by third parties that may intercept the messages in route. This need arises, for example, when the messages traverse a network, such as the Internet, that is accessible to third parties.

Typically, a sending computing component and a receiving computing component will both possess shared secret data. The sending computing component uses the shared secret data to encode a message to generate an encoded message. The sending computing component sends the encoded message to the receiving computing component. The receiving computing component uses the shared secret data to decode the encoded message. The encoded message may be very difficult to decode without the shared secret data, which may deter or prevent unauthorized parties from decoding the message even if it is intercepted.

BRIEF DESCRIPTION OF DRAWINGS

The present disclosure is illustrated by way of example and not limitation in the following figures.

DETAILED DESCRIPTION

Figure 1:
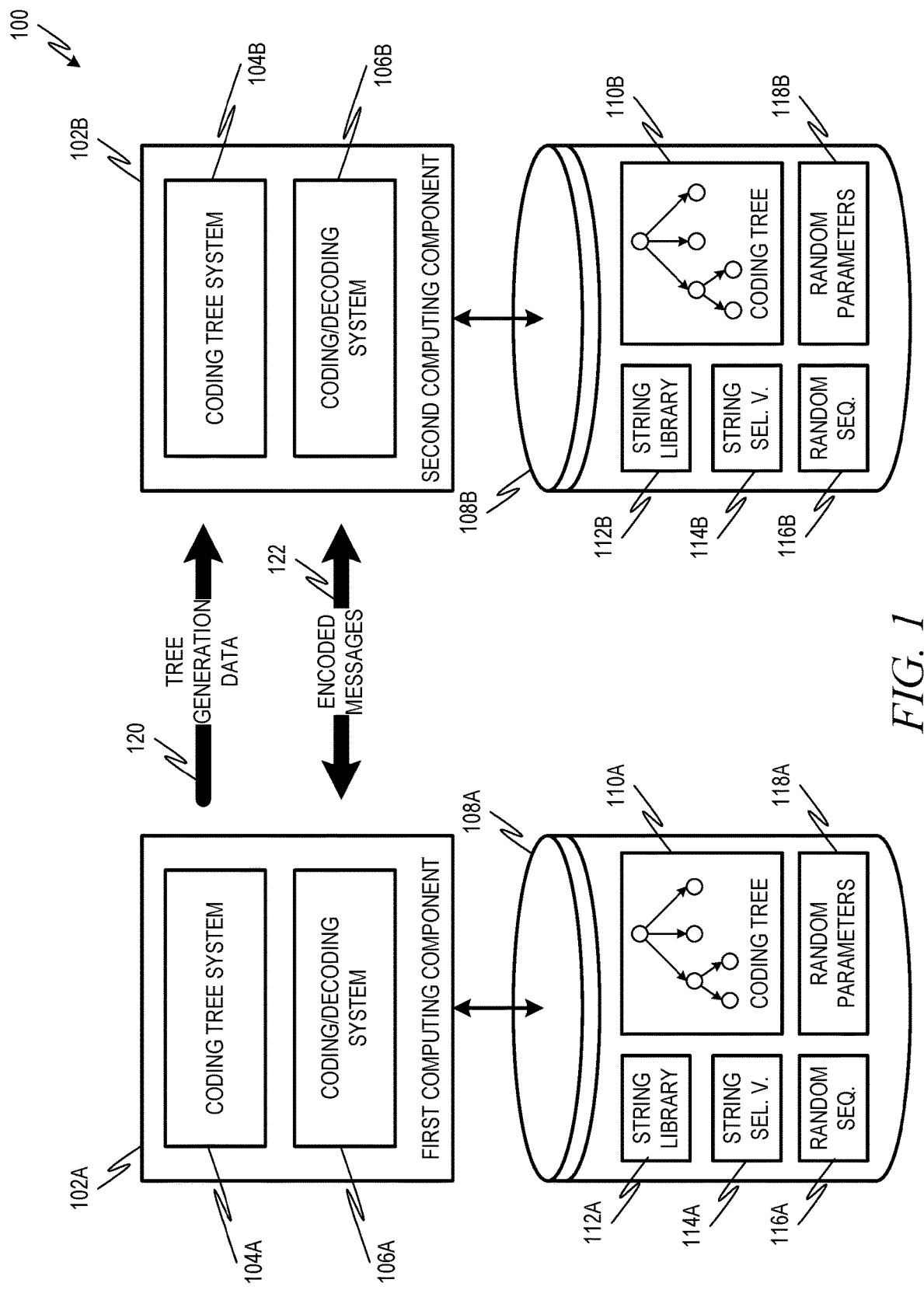
FIG. 1 is a diagram showing one example of an environment for secure messaging between computing components.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Before providing additional details of secure messaging, several concepts will be introduced. A message comprises symbols. A symbol may include one or more bits of data that represent a common concept. Example concepts that may be represented by a symbol include, one or more alphanumeric symbols, one or more mathematical operators, one or more words, etc. At least some of the symbols in a message may be ordered. An ordered set of symbols may have a defined order. For example, a first symbol may precede a second symbol in the message. The second symbol may precede a third symbol in the message, and so on. A set of one or more ordered symbols may be referred to as a string.

A prefix of a string may be another string that begins with the same symbol or symbols as the first string. For example, consider a string "ABCD," where the symbols are the letters "A," "B," "C," and "D." The string "ABCD" may have a common prefix with strings "A," "AB," "ABC," and "ABCD," "ABXY," etc. The common prefix may be the leading symbols of the strings that are equivalent. For example, the string "ABCD" and the string "ABCZ" include the common prefix "ABC." The string "ABCD" and the string "ABXY" may include the common prefix "AB." A suffix of a string may be another string that ends with the same symbol or symbols as the first string. For example, the string "ABCD" may have a common suffix with strings "XYCD," "CBAD," "XBCD," "ABCD," etc. The strings "ABCD" and "XYCD" may have the common suffix "D." The strings "ABCD" and "XYCD" may have the common suffix "CD."

Various examples described herein are directed to systems and methods for secure messaging between computing components. A first computing component may encode a message using a coding tree to generate an encoded message. In some examples, the encoded message may also be compressed. For example, the encoded message may include fewer symbols than the original message. The first computing component may send the encoded message to a second computing component, which may decode the encoded message with a copy of the coding tree to re-create the original message.

In various examples, a first computing component and a second computing component may exchange tree generation data. The tree generation data may enable the first and second computing devices to independently generate the coding tree used to encode messages and to decode encoded messages. The coding tree data may comprise a number of nodes and a number of edges directed from one node and sometimes to another node. Each edge may be associated with an edge string including one or more symbols and with an edge indicator symbol or symbols. In some examples, the first and second computing components are configured to perform both encoding and decoding with the coding tree. This may enable bi-directional communication between the computing components.

To encode a message, the first computing component may begin at a root node of the coding tree and select a first edge that is directed from the root node and that has an associated edge string having a common prefix with the message. The first computing component may write the edge indicator symbol of the first edge to an encoded message. The edge indicator symbol may represent a first set of message symbols corresponding to the common prefix. Subsequently, the first computing component may consider a remainder of the message (e.g., the message symbols that are positioned after the common prefix, sometimes referred to herein as the message remainder). The first computing component may locate a second edge directed from the second node that has an associated edge string having a common prefix with the remainder of the message. The first computing device may write the edge indicator symbol of the second edge to the encoded message after the edge indicator symbol of the first edge to represent a second set of message symbols corresponding to the second common prefix. The first computing device may then search for an edge directed from the second node that has a common prefix with the new remainder of the message. This process may continue until all symbols of the message are represented at the encoded message. Because, in this example, multiple symbols from the message are replaced by an edge indicator symbol, which may be a single symbol, compression can also occur. For example, the encoded message may include fewer symbols than the original message.

In some examples, the first computing device may encounter one or more scenarios where a message or message remainder does not exactly match the coding tree. For example, some edge strings may include additional symbols after a common prefix. When an edge string includes additional symbols after the common prefix, the first computing component may associate a partial edge indicator with the edge indicator symbol written to the encoded message. For example, the first computing device may write the partial edge indicator to the encoded message either before or after the associated edge indicator symbol. In some examples, the partial edge indicator may indicate the number of non-common symbols (e.g., the symbols that should not be included when the message is decoded). In one example where a common prefix includes symbols "ABC" and an edge string is "ABCXYZ," the partial edge indicator may indicate that the last three symbols of the edge string are not part of the message. For example, the partial edge indicator may be "−3."

Also, in some examples, the edges directed from a given node may not have any edge strings having a common prefix with the remainder of the message. When this occurs, the first computing device may write a root indicator to the encoded message and return to the root of the coding tree. For example, the first computing device may identify an edge directed from the root node whose edge string has a common prefix with the remainder of the message. The root indicator may be one or more symbols that indicate to a decoding computing component that it should also return to the root node. In some examples, the coding tree is constructed, as described herein, such that the root node includes edges directed therefrom that begin with all of the allowable symbols.

The first computing device may send the encoded message to the second computing device, which may decode it. For example, the symbols of the encoded message may correspond to the edge indicator symbols of the coding tree. The second computing device may begin at the root node. It may traverse the edge directed from the root node that corresponds to the first edge indicator symbol in the encoded message. It may write to a clear message the edge string associated with that edge. The second computing device may then determine if the next symbol in the encoded message is another edge indicator symbol (for example, the next symbol in the encoded message may be a root indicator or a partial edge indicator). If the next symbol in the encoded message is a partial edge indicator, the second computing device may remove from the edge string a suffix with a number of symbols indicated by the partial edge indicator. This may be done before or after the edge indicator symbol is written to the clear message. If the next symbol in the encoded message is a root indicator, the second computing device may return to the root node and select a next edge directed from the root node. This may proceed until the message is re-created.

FIG. 1 is a diagram showing one example of an environment 100 for secure messaging between computing components. The environment 100 comprises a first computing component 102A and a second computing component 102B. The computing components 102A, 102B may be, or be executed on, any suitable type of computing device. An example computing device architecture that may be or be used to execute one or both of the computing components 102A, 102B is described herein with respect to FIG. 8. An example hardware architecture that may be or be used to execute one or both of the computing components 102A, 102B is described herein at FIG. 9.

Computing components 102A, 102B may include respective coding tree systems 104A, 104B and coding/decoding systems 106A, 106B. Systems 104A, 104B, 106A, 106B may be implemented in any suitable combination of hardware and software. Coding tree systems 104A, 104B may be programmed to generate respective coding tree copies 110A, 110B. Coding/decoding systems 106A, 106B may be programmed to encode and/or decode messages, as described herein.

Computing components 102A, 102B may be in communication with respective data stores 108A, 108B. Data stores 108A, 108B, for example, may be physical storage devices in direct communication with the computing components 102A, 102B and/or in communication with one or more computing devices executing computing components 102A, 102B. Computing components 102A, 102B may utilize data stores 108A, 108B to store various data related to secure messaging. For example, data stores 108A, 108B may include coding trees 110A, 110B generated by the coding tree systems 104A, 104B. (Coding trees 110A, 110B, as described herein, may be equivalent to one another so as to be considered copies of the same coding tree). Data stores 108A, 108B may also include a string library 112A, 112B, a string selection vector 114A, 114B, a random sequence generator 116A, 116B, and random parameters 118A, 118B.

Focusing first on the first computing component 102A, the coding tree system 104A may generate the coding tree 110A based at least in part on other data at the data store 108A such as, for example, the string library 112A, the string selection vector 114A, the random sequence 116A, and the random parameters 118A. The string library 112A may comprise a number of strings made up of symbols that include symbols to be included messages sent between the computing components 102A, 102B. Any suitable string library may be used. The string selection vector 114A may include data describing a set of strings from the string library 112A that will be used to construct the coding tree 110A. The string selection vector 114A may take any suitable form. In some examples, strings at the string selection library 112A have an associated key or address. The string selection vector 114A may include data describing the keys or addresses of strings to be selected from the string library 112A to form the coding tree 110A. In other examples, the string selection vector 114A may take other forms.

The random sequence 116A may be or comprise code for executing a pseudorandom number generator. For example, a pseudorandom number generator may be an algorithm that, when executed by a processor unit, generates a set of ordered, random numbers. In some examples, numbers generated by the random sequence 116A may be based on random parameters 118A. For example, the random sequence 116A may generate the same series of random numbers when provided with the same set of random parameters 118A.

The coding tree system 104A may utilize the string selection vector 114A to select the set of strings from the string library 112A. The coding tree system 104A may also utilize the random parameters 118A in conjunction with the random sequence 116A to generate a set of one or more random numbers (which may be random or pseudorandom). The set of random numbers may be utilized to shuffle the order of the set of strings to form a shuffled set of strings. The coding tree system 104A may utilize the shuffled set of strings to generate the coding tree 110A. For example, the coding tree 110A may be a suffix tree of the shuffled set of strings.

The first computing component 102A may provide tree generation data 120 to the second computing component 102B. Tree generation data 120 may include data for generating the respective coding trees 110A, 110B. For example, tree generation data 120 may include the string selection vector 114A and random parameters 118A. In some examples, tree generation data 120 may include a reference to the string library 112A and/or to the random sequence 116A. The reference may enable the second computing component 102B to identify and/or retrieve its copies 112B, 116B of the string library 112A, and random sequence 116B to generate the coding tree 110B. In some examples, it may not be possible to easily generate the coding tree 110B without the string selection vector 114B and/or the random sequence 116B, so these components 112B, 116B, may not need to be kept secret. In some examples, the tree generation data 120 may also include the string library 112B and/or random sequence 116B.

The second computing component 102B may utilize the tree generation data 120 to generate its copy of the coding tree 110B. In this way, the tree generation data 120 may act as a session key enabling the computing components 102A, 102B to execute a symmetric encoding, as described herein. For example, the computing components 102A, 102B may exchange encoded messages 122. The computing components 102A, 102B may use their respective copies of the coding tree 110A, 110B to encode messages directed to the other computing component 102A, 102B and to decode encoded messages received from the other computing component 102A, 102B.

Figure 2:
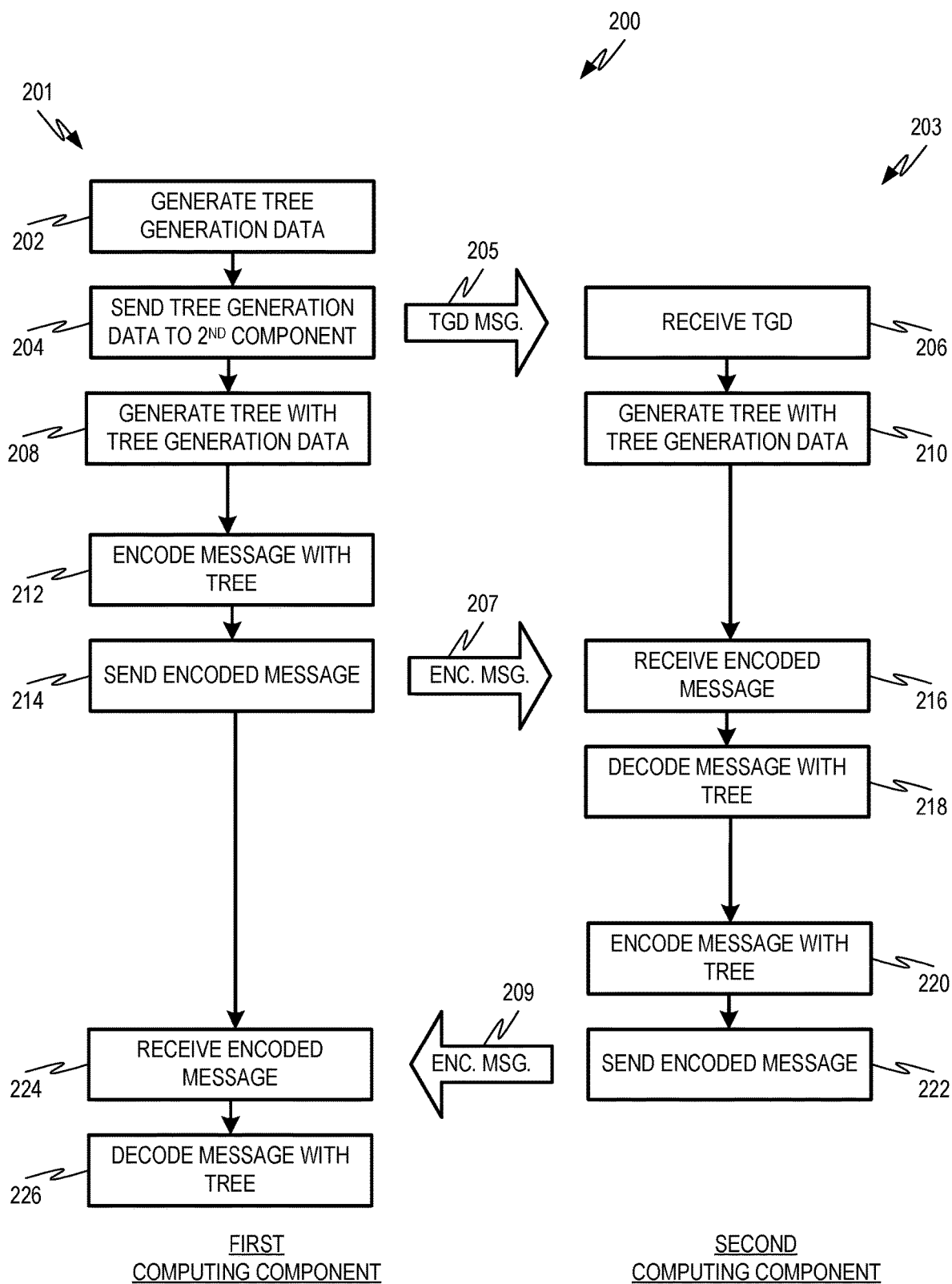
FIG. 2 is a flowchart showing one example of a process flow illustrating examples of securing messaging between the first and second computing components of the environment shown in FIG. 1.

FIG. 2 is a flowchart showing one example of a process flow 200 illustrating examples of securing messaging between the first computing component 102A and the second computing component 102B. The process flow 200 includes two columns. Column 201 includes operations that may be performed by the first computing component 102A. Column 203 includes operations that may be performed by the second computing component 102B.

At operation 202, the first computing component 102A may generate tree generation data, such as tree generation data 120 described above. At operation 204, the first computing component 102A may send a tree generation data message 205 to the second computing component 102B. The tree generation data message 205 may include the tree generation data 120 described herein. In some examples, the tree generation data message 205 may be encrypted or otherwise protected to prevent the risk of an unauthorized third party accessing the tree generation data 120. For example, the first computing component 102A may encrypt the tree generation data 120 to generate the tree generation data message 205. In some examples, the computing components 102A, 102B may utilize a public key infrastructure. For example, the second computing component 102B may comprise a public key and a private key. In some examples, the public key is digitally signed or otherwise attested to by a digital certificate authority or other trusted third party. The first computing component 102A may encrypt the tree generation data 120 utilizing the public key of the second computing component 102B. The second computing component 102B may decrypt all or a portion of the tree generation data message 205 to recreate the tree generation data 120. In some examples, it may be difficult for third parties to intercept the tree generation data message 205 and read the tree generation data 120 without possessing the private key of the second computing component 102B.

The second computing component 102B may receive the tree generation data message 205 at operation 206 and use the tree generation data 120 therein to generate the coding tree 110B at operation 210. The first computing component 102A may generate the coding tree 110A from the tree generation data at operation 208. The first computing component 102A may generate the coding tree 110A before or after providing the tree generation data message 205 to the second computing component 102B.

At operation 212, the first computing component 102A may encode a message using the coding tree 110A. At operation 214, the first computing component 102A may send an encoded message 207 to the second computing component 102B. The encoded message 207 may be part of the encoded messages 122 shown in FIG. 1. The second computing component 102B may receive the encoded message 207 at operation 216 and may decode the encoded message 207 using the coding tree 110B at operation 218.

At operation 220, the second computing component 102B may encode a message using the coding tree 110B. At operation 222, the second computing component 102B may send an encoded message 209 to the first computing component 102A. The encoded message 209 may also be part of the encoded messages 122 shown in FIG. 1. The first computing component 102A may receive the encoded message 209 at operation 224 and may decode the encoded message 209 using the coding tree 110A at operation 226. The process flow 200 shows the first computing component 102A sending one encoded message 207 to the second computing component 102B and the second computing component 102B sending one encoded message 209 to the first computing component 102A. In some examples, the computing components 102A, 102B may send one or more additional encoded messages to one another utilizing the coding trees 110A as described herein. Also, in some examples, communication between the computing components 102A, 102B may be uni-directional. For example, encoded messages may be sent only from the first computing component 102A to the second computing component 102B or only from the second computing component 102B to the first computing component 102A.

Figure 3:
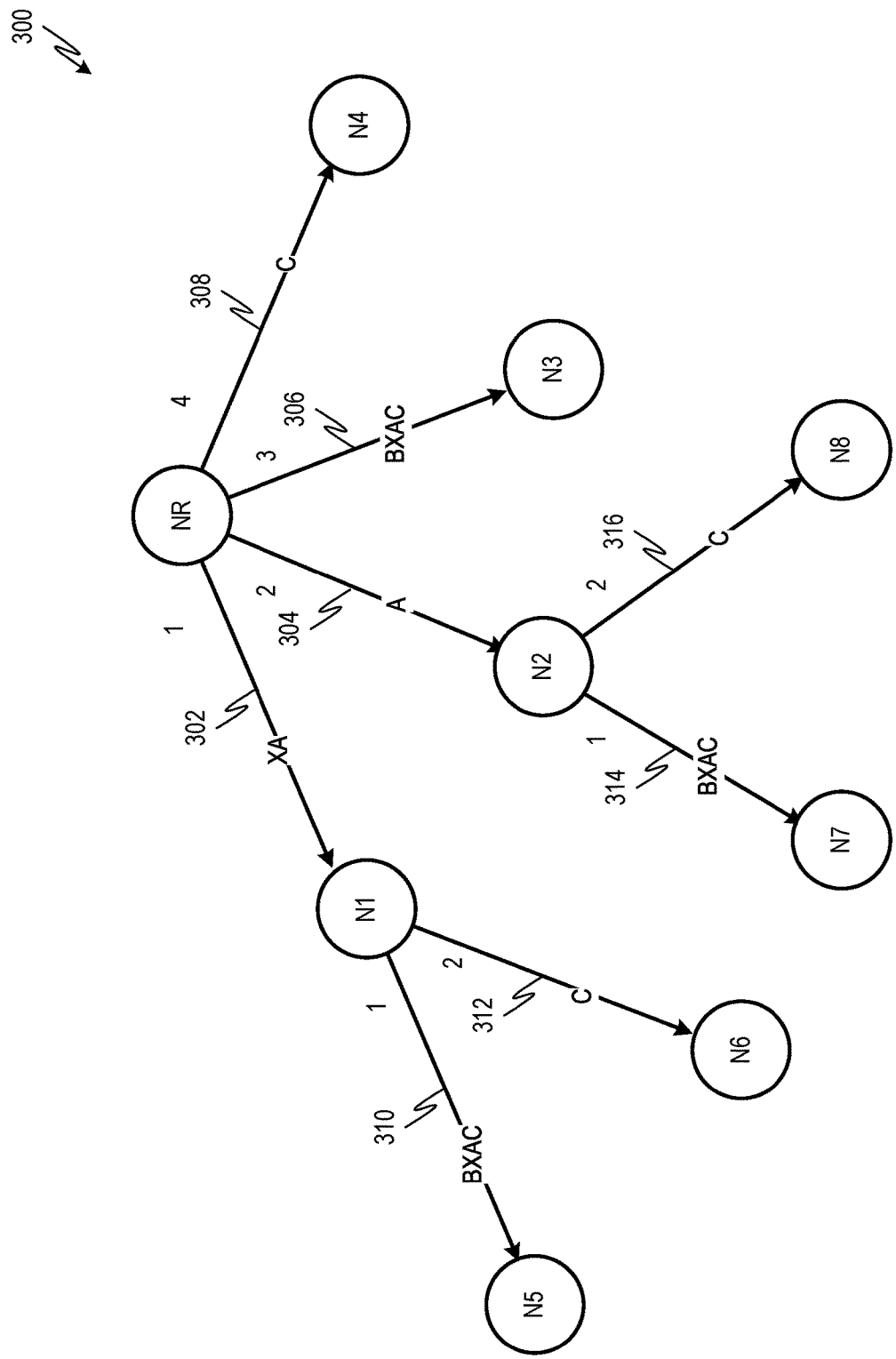
FIG. 3 is a diagram illustrating one example of a coding tree.

FIG. 3 is a diagram illustrating one example of a coding tree 300. The example coding tree 300 comprises a number of nodes, labeled NR, N1, N2, N3, N4, N5, N6, N7, N8. The example coding tree 300 also comprises a plurality of edges 302, 304, 306, 308, 310, 312, 314, 316. Each of the edges 302, 304, 306, 308, 310, 312, 314, 316 is directed from one of the nodes NR, N1, N2, N3, N4, N5, N6, N7, N8 to another of the nodes NR, N1, N2, N3, N4, N5, N6, N7, N8. An edge 302 is directed from a root node NR to node N1. An edge 304 is directed from the root node NR to the node N2. An edge 306 is directed from the root node NR to a node N3. An edge 308 is directed from the root node NR to the node N4. An edge 310 is directed from the node N3 to a node N5. An edge 312 is directed from the node N3 to a node N6. An edge 314 is directed from the node N4 to a node N7. An edge 316 is directed from the node N4 to a node N8.

Also, as shown, each edge 302, 304, 306, 308, 310, 312, 314, 316 comprises an edge string and an edge indicator symbol. In FIG. 3, edge strings are printed on the edges themselves. For example, the edge 302 has an edge string "XA," the edge 304 has an edge string "A," the edge 306 has an edge string "BXAC" and so on. In some examples, edge indicator symbols may be based on the node from which an edge is directed, and may be re-used at different nodes. For example, in FIG. 3, edge indicator symbols are numerals. The edges 302, 304, 306, 308 that are directed from the rood node NR have respective edge indicator symbols "1," "2," "3," and "4." Similarly, edges 310 and 312 that depend from node N3 have respective edge indicator symbols "1" and "2." Edges 314 and 316 have respective edge indicator symbols "1" and "2." It will be appreciated that the coding tree 300 is but on example coding tree that is used to explain and illustrate various examples herein. In practice, coding trees may have many other configurations.

Figure 4:
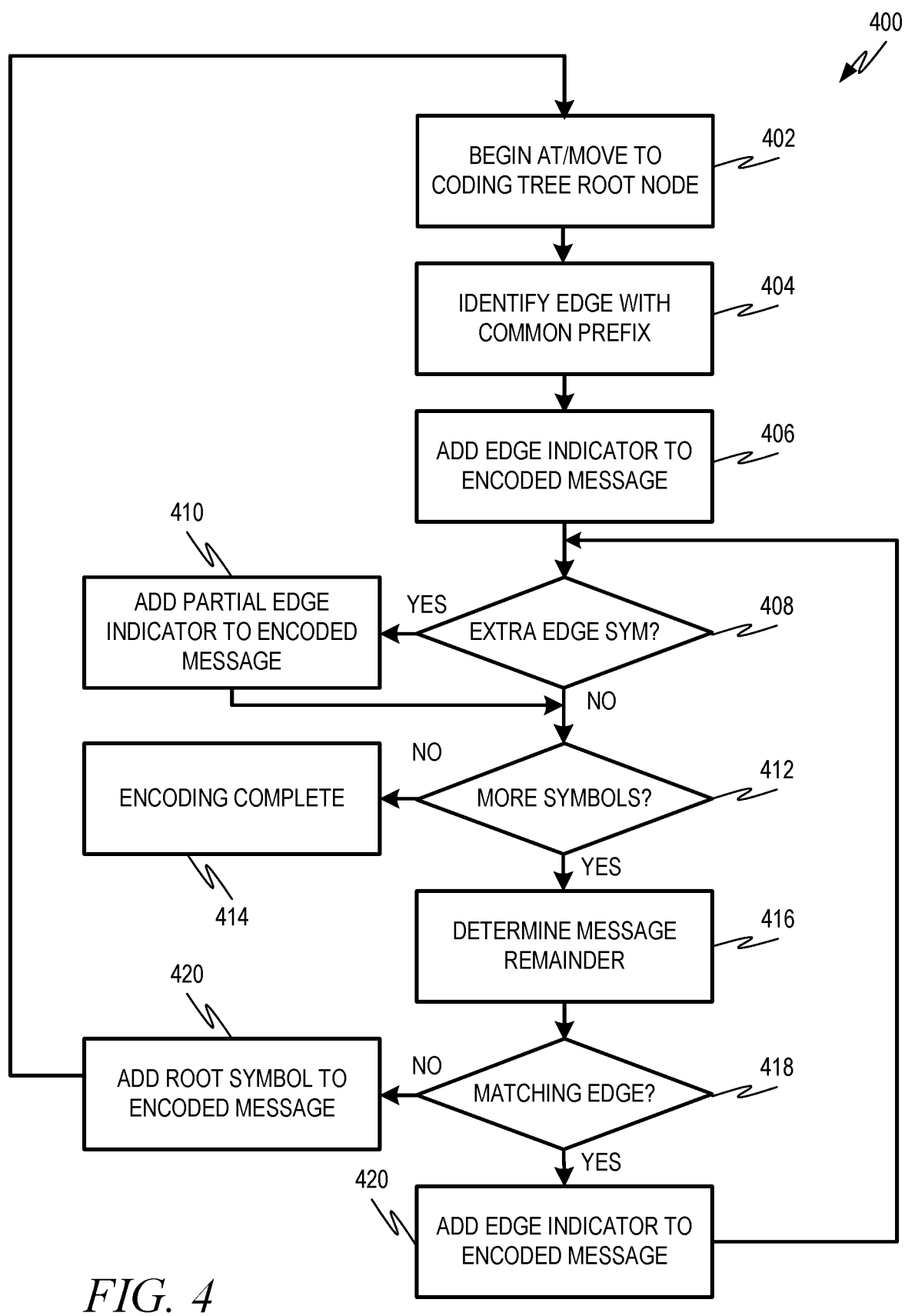
FIG. 4 is a flowchart showing one example of a process flow that may be executed by a computing component to encode a message.

FIG. 4 is a flowchart showing one example of a process flow 400 that may be executed by a computing component to encode a message. In the description of FIG. 4, the process flow 400 is described as being executed by an encoding component. In various examples, the encoding component may be either computing component 102A, 102B (e.g., the coding/decoding system 106A, 106B thereof). Also, the description of FIG. 4 describes the use of a coding tree. The referred-to coding tree may be any coding tree described herein and/or generated as described herein.

The process flow 400 may begin with a clear message or message to be encoded. The message may be a string including an ordered set of symbols. In some examples, the encoding component may consider the symbols of the message in order. The process flow 400 will describe the encoding component considering the message in order from beginning to end, however, in some examples, the message could also be considered in order from end to beginning. The result of the process flow 400 may be an encoded message that is also a string including an ordered set of symbols. For example, as described, symbols in the message may be equivalent to some or all of the edge indicator symbols of the coding tree.

At operation 402, the encoding component may begin at a root node of the coding tree. At operation 404, the encoding component may identify an edge directed from the root node that has an edge string that has a common prefix with the message. At operation 406, the encoding component may write the edge indicator symbol of the edge identified at operation 404 to the encoded message. For example, referring to FIG. 3, if the identified edge is the edge 306, the encoding component may write its edge indicator symbol (i.e., "3") to the encoded message. At operation 408, the encoding component may determine whether the edge string for the edge identified at operation 404 includes additional symbols after the common prefix. If the edge string does include additional symbols, the encoding component may, at operation 410 add a partial edge indicator. In some examples, the partial edge indicator may comprise one or more symbols indicating a number of symbols in the edge string after the common prefix.

If the edge string does not include symbols after the common prefix, or after adding the partial edge indicator at operation 410, the encoding component may determine, at operation 412, if the message includes additional symbols after the common prefix from operation 404. If not, the encoding may be complete at operation 414. If the message does include additional symbols after the common prefix, the encoding component may, at operation 416, determine a remainder of message. The remainder of the message (or message remainder) may comprise the ordered symbols of the message after the common prefix of operation 404. For example, the first symbol of the message after the prefix may be considered the first symbol of the message remainder.

At operation 418, the encoding component may identify the node directed to by the edge identified at operation 404 and determine whether there are any edges that are directed from that node that have edge strings that have a common prefix with the message remainder. If yes, the encoding component may add the edge indicator of the edge identified at operation 418 to the encoded message and proceed again to operation 408, this time with reference to the edge identified at operation 418. On the other hand, if the node considered at operation 418 does not include an edge having an edge string with a common prefix to the message remainder, the encoding component may add a root symbol to the encoded message and return to operation 402, where the encoding component may return to the root node. In some examples, the coding tree may be constructed with strings from the string library 112A, 112B such that the selected strings include at least one string beginning with every symbol that will be used in the message. In this way, the encoding component may also identify an edge at 404 that has a common prefix with the message (or the considered message remainder).

Figure 5:
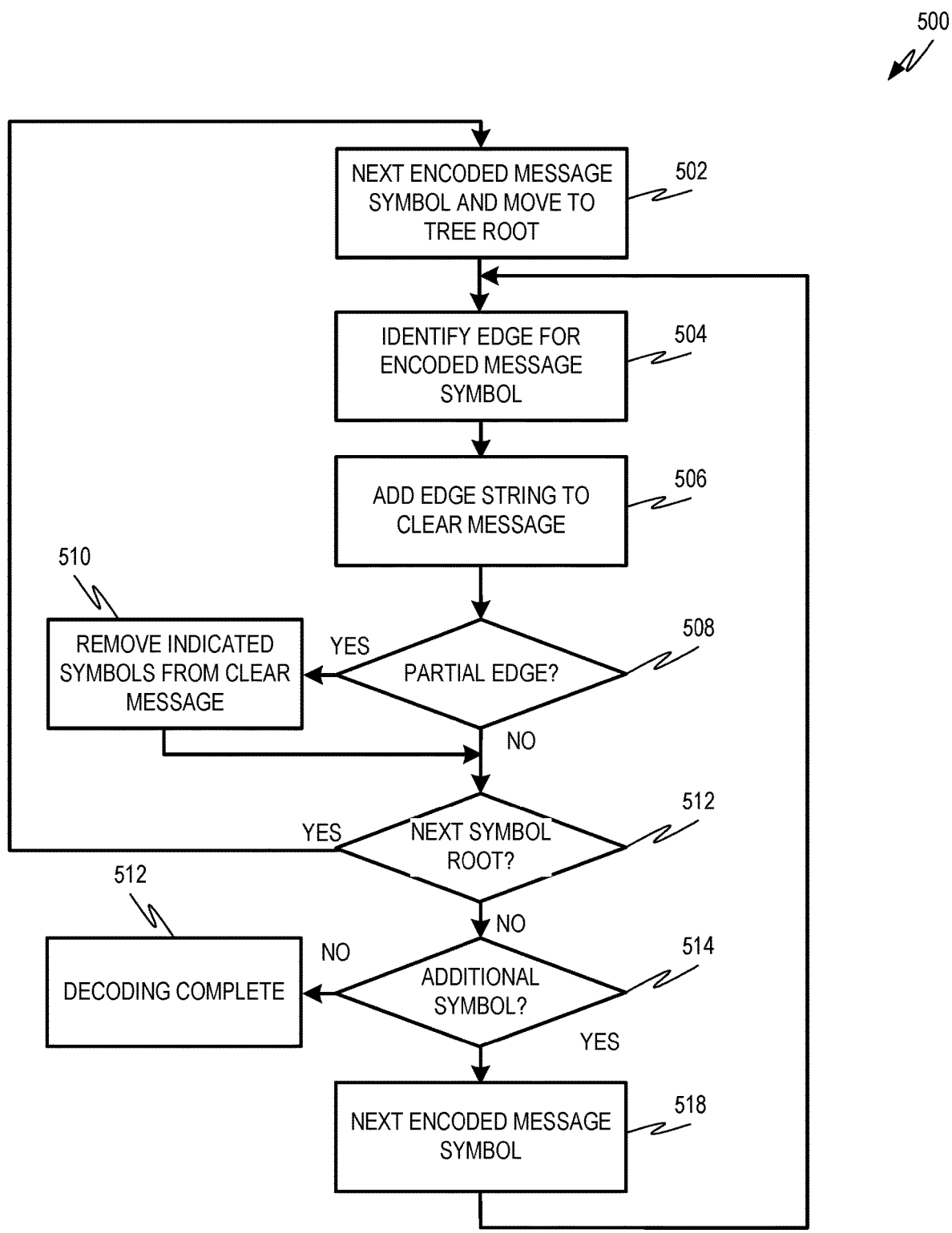
FIG. 5 is a flowchart showing one example of a process flow that may be executed by a computing component to decode a message.

FIG. 5 is a flowchart showing one example of a process flow 500 that may be executed by a computing component to decode a message. In the description of FIG. 5, the process flow 500 is described as being executed by a decoding component. In various examples, the decoding component may be either computing component 102A, 102B (e.g., the coding/decoding system 106A, 106B thereof). Also, the description of FIG. 5 describes the use of a coding tree. The referred-to coding tree may be any coding tree described herein and/or generated as described herein.

The process flow 500 may begin with an encoded message, for example, determined as described by the process flow 400. For example, the encoded message may be a string including an ordered set of symbols. In some examples, the decoding component may consider the symbols of the encoded message in order. The process flow 500 will describe the decoding component considering the encoded message in order from beginning to end, however, in some examples, the message could also be considered in order from end to beginning (for example, if the encoded message was encoded from end to beginning). The result of the process flow 500 may be the originally encoded message, which may also be a string including an ordered set of symbols.

At operation 502, the decoding component may consider a next encoded message symbol and to the root of the coding tree. At the outset, the next encoded message symbol may be the first symbol of the encoded message. At operation 504, the decoding component may identify an edge directed from the root node that corresponds to the considered encoded message symbol. At operation 506, the decoding device may add the edge string of the edge identified at operation 504 to the message (e.g., the clear, decoded message).

At operation 508, the decoding component may determine whether the considered encoded message symbol is associated with a partial edge indicator. For example, one or more symbols positioned in the encoded message after (e.g., immediately after) the considered encoded message symbol may, if present, indicate a partial edge. As described above, in some examples, a partial edge indicator may be positioned before the considered encoded message symbol. If a partial edge indicator is determined, the decoding component may remove from an end of the edge string a number of symbols indicated by the partial edge indicator. This may be performed after the edge string is written to the message at operation 506. In some examples, however, removal of indicated symbols from the edge string at operation 510 may be performed before the edge string is written to the message at operation 504.

If no partial edge indicator is found at operation 508 and/or after removing the indicated number of symbols at operation 510, the decoding component may determine at operation 512 whether the next symbol in the encoded message is a root symbol. (In cases where the partial edge indicator is positioned in the encoded message after the considered symbol, a symbol or symbols making up the partial edge indicator may not be considered the next symbol at operation 512. Instead the first symbol in the encoded message after the partial edge indicator symbol or symbols may be considered the next symbol).

If the next symbol is a root symbol, then the decoding component may return to operation 502, return to the root node of the coding tree, and move to the next symbol in the encoded message that is to be considered (e.g., the next symbol that is neither a root symbol nor a partial string indicator symbol). If the next symbol is not a root symbol, the decoding component may determine, at operation 514, whether there are additional symbols in the encoded message. If not, then decoding may be complete at operation 512. If yes, the decoding component may consider the next symbol in the encoded message at operation 518 (e.g., the next symbol that is not a root symbol or partial string indicator symbol) and return to operation 504 to identify an edge from the new node.

To further illustrate the encoding process flow 400 and decoding process flow 500, consider the example coding tree 300 of FIG. 3 and an example message comprising the string "XAC." At operation 402, the encoding component may begin at the root node NR. At operation 404, the encoding component may identify edge 302 as having an edge string with a common prefix as the message. As illustrated, the edge 302 has an edge string "XA," while the message is "XAC." Accordingly, the common prefix is "XA." At operation 406, the encoding component may write the edge indicator symbol of the edge 302 (e.g., "1") to the encoded message.

At operation 408, the encoding component may determine that there are no extra symbols in the edge string because there are no symbols in the edge string "XA" after the common prefix, which in this example is also "XA." At operation 412, the encoding component may determine that there are more symbols in the message after the common prefix. At operation 416, the encoding component may determine the message remainder. In this example, after the common prefix "XA," the remainder of the message is the single symbol "C." At operation 418, the encoding component may identify the node N1 (to which the edge 302 is directed) and determine that edge 312 directed from the node N1 has an edge string with a common prefix to the message remainder. For example, the edge string "C" has a common prefix to the message remainder "C" that is the symbol "C."

At operation 420, the encoding component may add the edge indicator of the edge 312 (e.g., "2") to the encoded message. For example, after the operation 420, the encoded message may include the string "12." At operation 408, the encoding component may determine that there are no extra edge symbols in the edge string "C." At operation 412, the encoding component may determine that there are no additional symbols in the message (e.g., "C" is the last symbol in the message). Accordingly, the encoding may be complete at operation 414, with the resulting encoded message being "12." In this example, the encoding also compresses the message because the message has three symbols while the encoded message has only two symbols.

The encoded message "12" may be similarly decoded utilizing the process flow 500. For example, at operation 502, the decoding component may start at the root node NR of the coding tree 300 and may first consider the first symbol "1" of the encoded message. At operation 504, the decoding component may identify the edge 302 as the edge corresponding to the edge indicator symbol "1." At operation 506, the decoding component may write the corresponding edge string "XA" to the message. At operation 508, the decoding component may determine that there is no partial edge indicator associated with the considered symbol "1." At operation 512, the decoding component may determine that the next symbol in the encoded message (e.g., "2") is not a root symbol. At operation 514, the decoding component may determine that there is an additional symbol in the encoded message and may, at operation 518, consider the next symbol in the encoded message (e.g., "2").

At operation 504, the decoding component may identify the edge directed from the node to which the edge 302 is directed (e.g., node N1) that has the edge indicator equivalent to the new considered symbol, "2." In the example, this is edge 312. At operation 506, the decoding component may write the edge string of the edge 312 to the message. The edge string of the edge 312 is "C." Accordingly, the message would read "XAC." At operation 508, the decoding component may determine that the symbol "2" is not associated with a partial edge indicator. At operation 512, the decoding component may determine that the next symbol in the encoded message is not a root symbol. (In this example, there are no additional symbols in the encoded message after "2.") At operation 514, the decoding component may determine that there are no additional symbols in the encoded message after the considered symbol. Accordingly, the decoding may be complete at operation 512, with the original message "XAC" reproduced.

Consider the example coding tree 300 of FIG. 3 and an example message comprising the string "XAAC." Referring to FIG. 4, at operation 402, the encoding component may begin at the root node N1 of the coding tree 300. At operation 404, the encoding component may identify an edge 302 having an edge string with a common prefix as the message. For example, the edge string "XA" has a common prefix with the message "XAAC." The common prefix is "XA." At operation 406, the encoding component may add the edge indicator for the edge 302 (e.g., 1) to the encoded message. Accordingly, at this point, the encoded message is "1." At operation 408, the encoding component may determine that there are no additional symbols in the edge string. At operation 412, the encoding device may determine that there are more symbols in the message. At operation 416, the encoding component may determine the message remainder. The message remainder may include the symbols after the common prefix. In this example, the symbols in the message after the common prefix "XA" are "AC."

At operation 418, the encoding component may determine if there is an edge from the node N1 (pointed to by the edge 302) that has an edge string with a common prefix to the message remainder. In this example, neither of the edge strings of edges 310, 312 have a common prefix with the message remainder "AC." Accordingly, the decoding device may add a root symbol to the encoded message at operation 420. In this example, the root symbol may be "0." Accordingly, at this point, the encoded message may be "10."

The encoding component may proceed again to operation 402 where it may move to the root node NR. At operation 404, the encoding component may identify the edge 304, which has an edge string with a common prefix "A" to the message remainder "AC." At operation 406, the encoding component may add the edge indicator "2" of the edge 304 to the encoded message. Accordingly, at this point, the encoded message may be "102." In this example there are no extra edge symbols (operation 408). There may be an additional symbol in the message at operation 412, so the encoding component may determine a new message remainder at operation 416. The new message remainder may be the symbol "C."

At operation 418, the encoding component may determine if there is an edge from the node N2 (pointed to by the edge 304) that has an edge string with a common prefix to the message remainder. In this example, the edge 316 has a common prefix with the message remainder. At operation 420, the encoding component may add the edge indicator "2" of the edge 316 to the encoded message. Accordingly, at this point, the encoded message may be "1022." In this example, there are no extra edge symbols (operation 408). At operation 412, the encoding component may determine that there are no additional symbols in the message, so the encoding may conclude at operation 414. The encoded message may be "1022."

The encoded message "1022" may be similarly decoded utilizing the process flow 500. For example, at operation 502, the decoding component may start at the root node NR of the coding tree 300 and may first consider the first symbol "1" of the encoded message. At operation 504, the decoding component may identify the edge 302 as the edge corresponding to the edge indicator symbol "1." At operation 506, the decoding component may write the corresponding edge string "XA" to the message. At operation 508, the decoding component may determine that there is no partial edge indicator associated with the considered edge indicator symbol.

At operation 512, the decoding component may determine that the next symbol in the encoded message (e.g., "0") is the root symbol. Accordingly, the decoding component may return to operation 502 and move to the next symbol in the encoded message "2." At operation 504, the decoding component may identify the edge 304 as the edge corresponding to the edge indicator symbol "2." At operation 506, the decoding component may write the corresponding edge string "A" to the message. Accordingly, at this point, the message may read "XAA." At operation 508, the decoding component may determine that there is no partial edge indicator associated with the considered edge indicator symbol. At operation 512, the decoding component may determine that the next symbol in the encoded message (e.g., "2") is not the root symbol. At operation 514, the decoding component may determine that there is an additional symbol in the encoded message. The decoding device may move to the next symbol (e.g., "2") at operation 518.

At operation 504, the decoding component may identify the edge corresponding to the next symbol (e.g., "2"), which is edge 316. At operation 506, the decoding component may add the edge string "C" for the edge 316 to the message, yielding "XAAC." At operation 508, the decoding device may determine that there is no partial edge indicator associated with the considered edge indicator symbol. At operation 512, the decoding device may determine that the next symbol is not the root symbol. At operation 514, the decoding device may determine that there are no additional symbols, so the decoding may complete at operation 512, yielding "XAAC" as the decoded message.

Consider the example coding tree 300 of FIG. 3 and an example message comprising the string "BXXXABX." Referring to FIG. 4, at operation 402, the encoding component may begin at the root node N1 of the coding tree 300. At operation 404, the encoding component may identify an edge 306 having an edge string with a common prefix as the message. For example, the edge string "BXAC" has a common prefix with the message "BXXXABX." The common prefix is "BX." At operation 406, the encoding component may add the edge indicator for the edge 302 (e.g., 3) to the encoded message. Accordingly, at this point, the encoded message is "3." At operation 408, the encoding component may determine that the edge string "BXAC" includes two extra symbols that are not included in the message. Accordingly, at operation 410, the encoding component may add a partial edge indicator to the encoded message. For example, an example partial edge indicator indicating two extra symbols may be "–2," so after operation 410 the encoded message may be "3-2."

At operation 412, the encoding component may determine that there are more symbols in the message, and at operation 416 may determine a message remainder, "XXABX." Because there are no edges directed from the node N3, which the edge 306 is directed to, the encoding component may add the root symbol to the encoded message at operation 420 and move to the root node NR at operation 402. At this point, the encoded message may be "3-20."

At operation 404, the encoding component may identify an edge 302 having an edge string "XA" with a common prefix as the message remainder. The common prefix may be "X." At operation 406, the encoding component may add the edge indicator "1" of the edge 302 to the encoded message, resulting in "3-201." At operation 408, the encoding component may determine that, again, there is an extra symbol "A" that is in the edge string "XA" but not part of the message remainder. Accordingly, at operation 410, the encoding component may add to the encoded message a partial edge indicator indicating one extra symbol, such as "4," yielding an encoded message of "3-201-1."

The encoding component may determine at operation 412 that additional symbols remain in the message and may find a new message remainder, "XABX," at operation 416. At operation 418, the encoding component may determine that node N1 does not include any edges having an edge string with a common prefix as the message remainder. Accordingly, at operation 420, the encoding component may add the root symbol "0" to the encoded message and return to the root node NR at operation 402. At this point, the encoded message may be "3-201-10."

At operation 404, the encoding component may identify the edge 302 as having an edge string, "XA" with a common prefix with the message remainder, where the common prefix is also "XA." At operation 404, the encoding component may add the edge indicator for the edge 302 to the encoded message, resulting in "3-201-101." Because there are no extra edge symbols in the edge string, the encoding component may determine, at operation 412, that there are additional symbols in the message and may determine a new message remainder, "BX" at operation 416.

At operation 418, the encoding component may determine that the edge 310 directed from the node N1 to which the previous edge 302 was directed, has an edge string "BXAC" with a common prefix (e.g., "BX") with the message remainder. At operation 406, the encoding component may add the edge indicator for the edge 310 (e.g., "1") to the encoded message, resulting in "3-201-1011." At operation 408, the encoding component may determine that there are two extra edge symbols. At operation 410, the encoding component may add a partial edge indicator indicating two extra edge symbols to the encoded message, resulting in "3-201-1011-2." At operation 412, the encoding component may determine that there are no additional symbols in the message. Accordingly, encoding may be complete at operation 414.

The encoded message "3-201-1011-2" may similarly be decoded utilizing the process flow 500. For example, at operation 502, the decoding component may start at the root node NR of the coding tree and may first consider the first symbol "3" of the encoded message. At operation 504, the decoding component may identify the edge 306 as corresponding to the edge indicator "3" from the root node NR. At operation 506, the decoding component may add the edge string BXAC to the message. At operation 508, the decoding component may determine that the partial edge indicator "−2" is associated with the edge indicator "3" and may, at operation 510, remove the indicated number of symbols from the message (e.g., 2 symbols) resulting in a message of "BX." At operation 512, the decoding component may determine that the next symbol "0" in the encoded message is the root symbol and may proceed to operation 502.

At operation 502, starting again from the root node NR, the decoding device may consider the next encoded message symbol "1." At operation 504, the decoding component may identify the edge 302 as corresponding to the edge indicator "1" and may, at operation 506, as its edge string "XA" to the message, resulting a message, at this point, of "BXXA." AT operation 508, the decoding component may recognize the partial edge indicator "−1" as associated with edge indicator "1" and may, at operation 510, remove one symbol from the message, resulting in "BXX."

At operation 512, the decoding component may determine that the next symbol of the encoded message is the root symbol "0." Accordingly, at operation 502, the decoding component may move to the next symbol of the encoded message "1" and return to the root node NR. At operation 504, the decoding component may identify the edge 302 as corresponding to the edge indicator "1." At operation 506, the decoding component may add the edge string "XA" for the edge 302 to the message, resulting in "BXXXA." This may not be a partial edge (operation 508) and the next symbol may not be the root symbol (operation 512). There may be additional symbols in the encoded message (operation 514), so the decoding component may move to the next encoded message symbol "1" at operation 518.

At operation 504, the decoding component may identify the edge 310 as corresponding to the edge identifier "1" and may add the corresponding edge string "BXAC" to the message at operation 506, resulting in a message of "BXXX-ABXAC." At operation 508, the decoding component may recognize the partial edge indicator "−2" associated with the edge identifier "1." Accordingly, at operation 510, the decoding component may remove the indicated two symbols from the message, resulting in "BXXXABX." At operation 514, the decoding component may determine that there are no more symbols in the encoded message, so the decoding may be complete at operation 512.

Figure 6:
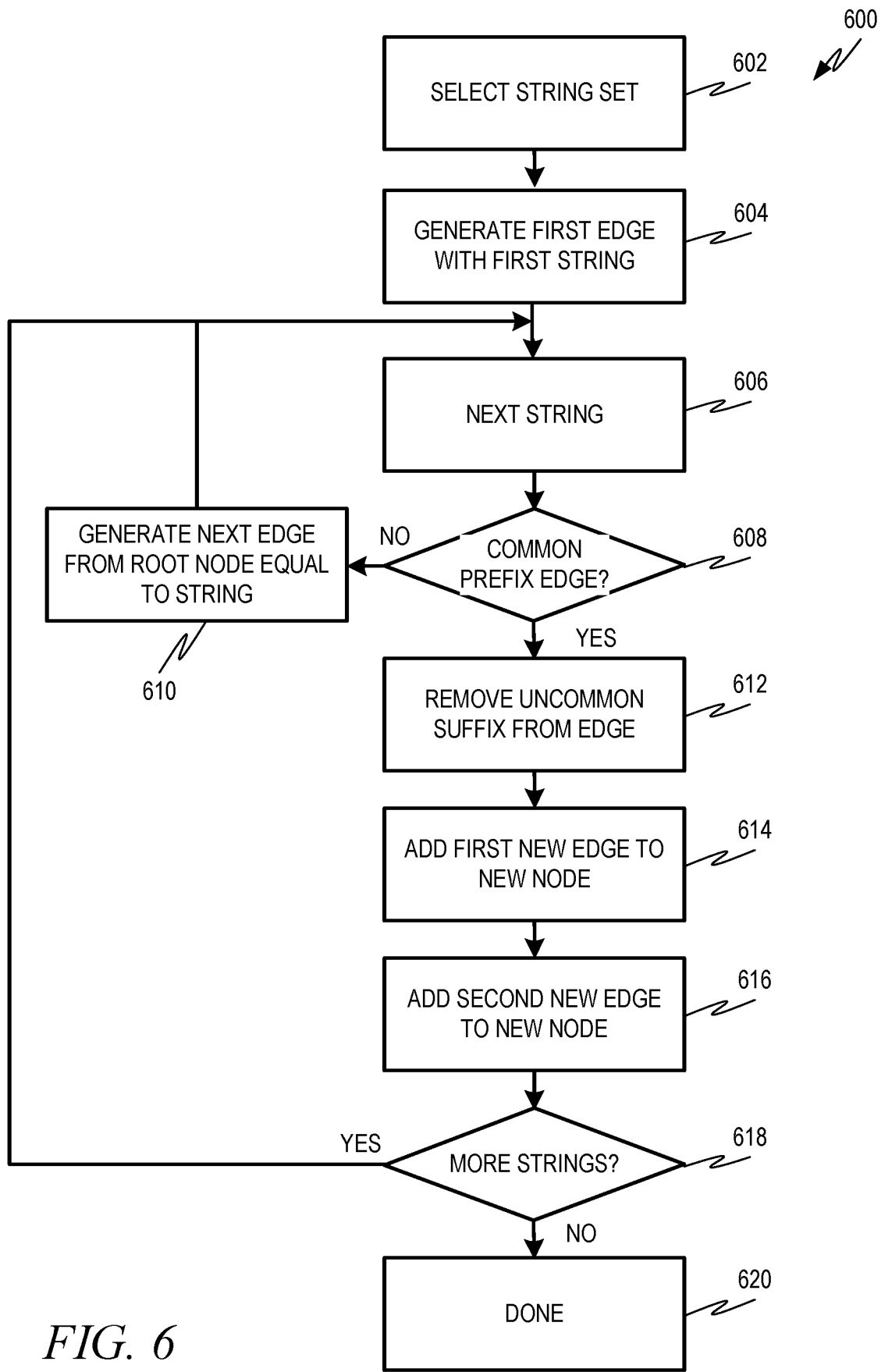
FIG. 6 is a flowchart showing one example of a process flow that may be executed by the first computing component and/or the second computing component of FIG. 1 to generate a coding tree.

FIG. 6 is a flowchart showing one example of a process flow 600 that may be executed by the first computing component 102A and/or the second computing component 102B to generate a coding tree. For example, the component executing the process flow 600 may begin with a copy of the string library 112A, 112B, a copy of the string selection vector 114A, 114B, a copy of the random sequence 116A, 116B and a copy of the random parameters 118A, 118B. At operation 602, the component may select a string set for the coding tree. For example, the component may apply the string selection vector 114A, 114B to select the string set from the string library 112A, 112B. Optionally, the component may utilize the random sequence 116A, 116B and random parameters 118A, 118B to shuffle the order of the string set. For example, as illustrated herein, the order in which strings from the string set are considered may determine the edge indicators for different edges of the coding tree.

At operation 604, the component may generate a first edge from a root node to a second node with a first string from the string set. The edge string for the first edge may, initially, be equal to the first string and the edge indicator may be set to "1," "A," or another symbol indicating a sequence. At operation the component may move to the next string in the string set. At operation 608, the component may determine whether the next string has a common prefix with any existing edges. If not, then the component may generate a next edge from the root node at operation 610. For example, the next edge may, at least initially, have an edge string equal to the next string and an edge indicator equal to the next symbol in the sequence begun by the first edge indicator from the root node.

If the next string does have a common prefix with an existing edge, the component may remove the uncommon suffix from the edge string for the edge and generated a new node to which the edge is directed. At operation 614, the component may add as first new edge to the new node. The first new edge may have an edge string equal to the uncommon suffix from the original edge string for the parent edge and an edge indicator equal to "1" or another suitable sequence value. At operation 616, the component may add a second new edge to the new node. The second new edge may have an edge string equal to the uncommon suffix from the original edge string for the considered string and may have an edge indicator positioned sequentially after the edge indicator for the first new edge. (In some examples, the sequence of the edge indicators for the new edges may be reversed.) At operation 618, the component may determine if there are additional strings in the string set. If not, then the coding tree is completed at operation 620. If yes, then the component may proceed to consider the next string at operation 606.

Figure 7:
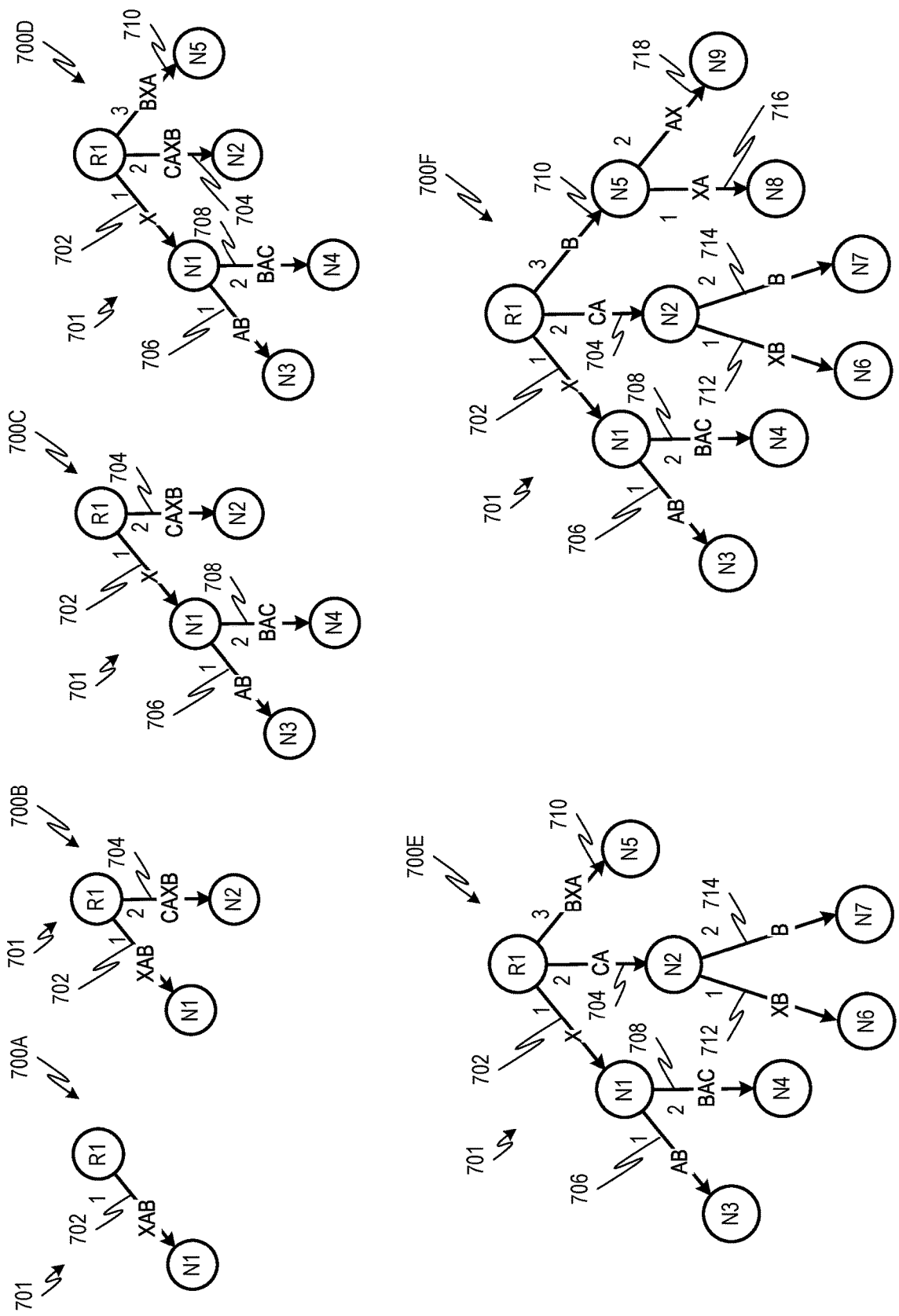
FIG. 7 is a diagram with iterations showing one example for the generation of a coding tree.

FIG. 7 is a diagram showing iterations 700A, 700B, 700C, 700D, 700E, 700F showing one example for the generation of a coding tree 701. The example coding tree 701 is generated from a set of strings ordered as indicated by TABLE 1 below:

TABLE 1

| Sequence Number | String |
| --- | --- |
| 1 | XAB |
| 2 | CAXB |
| 3 | XBAC |
| 4 | BXA |
| 5 | CAB |
| 6 | BAX |

In some examples, the set of strings may include at least one string beginning with every symbol that will be utilized in messages to be coded and/or decoded with the coding tree (e.g., every allowable symbol). In some examples, it may be advantageous to use string sets including more strings rather than fewer. For example, string sets including more strings may lead to more complex coding trees that can lead to faster coding and decoding as well as better compression.

Referring to the process flow 600 and to FIG. 7, at operation 604, the component may generate a first edge 702 from a root node R1 directed to a node N1 (see iteration 700A). The first edge 702 may, initially, have an edge string equal to the first string (e.g., "XAB"). An edge indicator "1" may the first in a sequence of edge indicators for edges from the root node R1. At operation 606, the component may move on to the next string, "CAXB." At operation 608, the component may determine that the next string does not share a common prefix with any existing edges at operation 608. Accordingly, at operation 610, the component may generate a next edge 704 (see iteration 700B). The edge 704 may have the next string "CAXB" as its initial edge string and may have an edge indicator, "2," that is the next indicator in the sequence of edge indicators for the edges from the root node R1.

At operation 606, the component may again move to the next string, "XBAC." At operation 608, the component may determine that the string "XBAC" does have a common prefix with the edge string "XAB" of the existing edge 302. The common prefix is "X." At operation 612, the component may remove the uncommon suffix from the edge string of the edge 302. For example, the new edge string for the edge 302 may be the common prefix, "X." The edge indicator of the edge 302 may not change. At operation 614, the component may generate a first new edge 706 with an edge string "AB" corresponding to the uncommon suffix "AB" from the previous edge string of the edge 302 (see iteration 700C). The edge indicator "1" for the edge 706 may indicate that it is the first edge to be directed from the node N1. At operation 616, the component may generate a second new edge 708 with an edge string "BAC" corresponding to the uncommon suffix from the considered string from the string set. The edge indicator "2" for the edge 708 may indicate that it is the second edge to be directed from the node N1. New edge 706 may be directed to a new node N3, while new edge 708 may be directed to a new node N4.

At operation 618, the component may determine that there are additional strings in the string set and may, at operation 606, move to the next string, "BXA." At operation 608, the component may determine that the considered string "BXA" does not have a common prefix with any existing edges. Accordingly, at operation 610, the component may generate a new edge 710 directed from the root node R1 to a new node N5. The edge 710 may have an edge string equal to the considered string "BXA" and an edge indicator "3" indicating that the edge 710 is the third edge to be directed from the root node R1.

At operation 606, the component may move to the next string, "CAB." At operation 608, the component may determine that the string "CAB" shares a common prefix with the edge string "CAXB" of the edge 704. Accordingly, at operation 612, the component may remove the uncommon suffix "XB" from the edge 704, leaving the edge 704 with an edge string "CA." The edge indicator for the edge 704 may be unchanged. At operation 614, the component may generate a first new edge 712 with an edge string "XB" equal to the uncommon suffix from the edge 704 (see iteration 700E). The first new edge 712 may have an edge indicator "1" indicating that it is the first edge to be directed from the node N2. At operation 618, the component may generate a second new edge 714 with an edge string "B" equal to the uncommon suffix from the string "CAB." The edge 714 may have an edge indicator "2" indicating that it is the second edge to be directed from the node N2.

At operation 618, the component may determine that there is an additional string and, at operation 606, the component may consider the next string "BAX." At operation 608, the component may determine that the considered string "BAX" has a common prefix with the edge string "BXA" of the edge 710. Accordingly, at operation 612, the component may remove the uncommon suffix "XA" from the edge string of the edge 710. At operation 614, the component may generate a first new edge 716 directed to a new node N8. The first new edge may have an edge string "XA" equal to the uncommon suffix from the previous edge string of the edge 710 (see iteration 700F). The first new edge 716 may have an edge indicator "1" indicating that it is the first edge to be directed from the node N5. At operation 616, the component may add a second new edge 718 directed from the node N5 to a new node N9. The second new edge 718 may have an edge string "AX" that is equal to the uncommon suffix of the considered string and an edge indicator "2" indicating that it is the second edge to be directed from the node N5. At operation 618, the component may determine that there are no more strings in the string set and may complete the coding tree 701 at operation 620.

Figure 8:
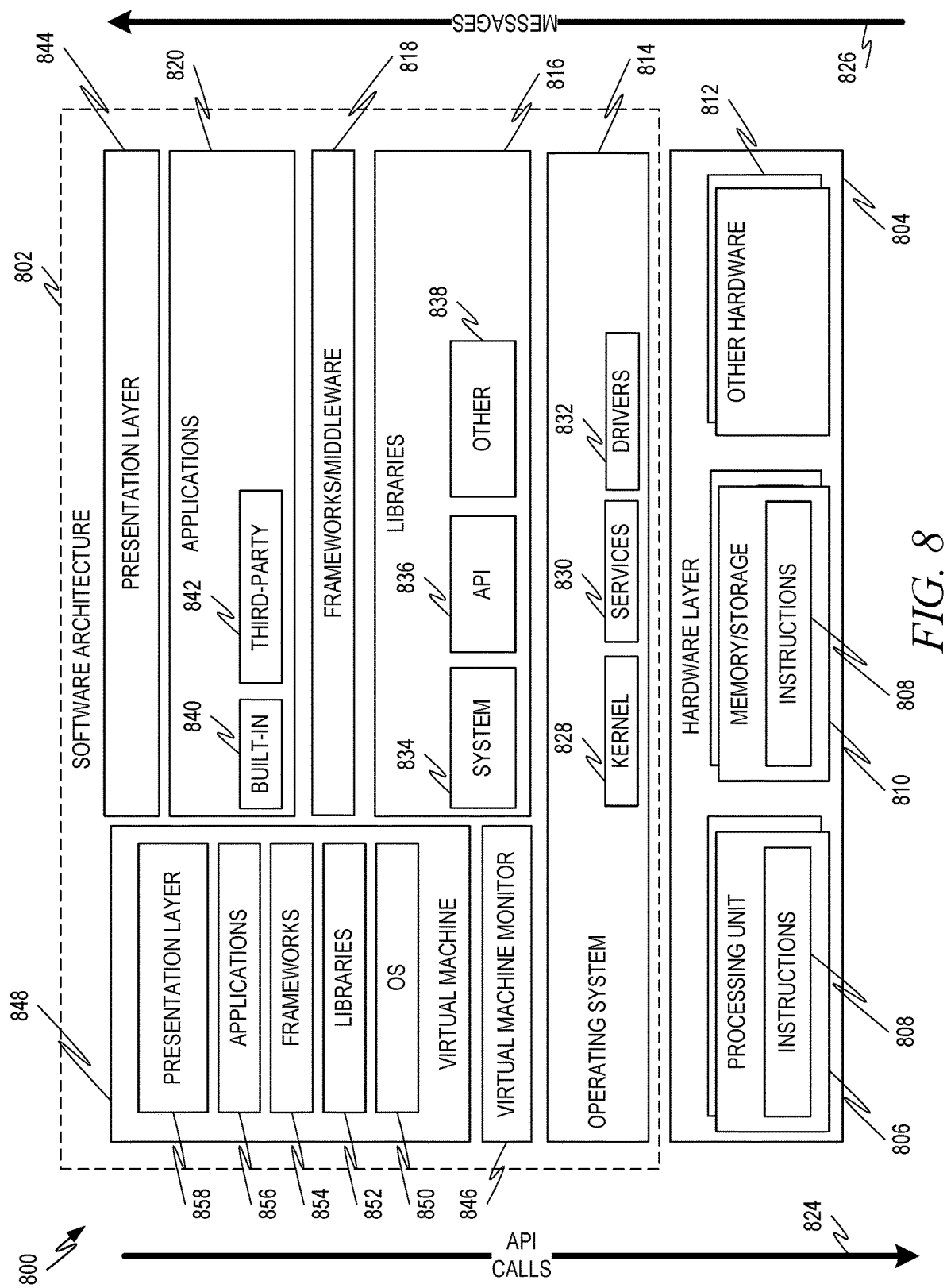
FIG. 8 is a block diagram showing one example of a software architecture for a computing device.

FIG. 8 is a block diagram 800 showing one example of a software architecture 802 for a computing device. The architecture 802 maybe used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system 900 of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of computer system 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 includes built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built in applications as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system 834, APIs 836, and other libraries 838), frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
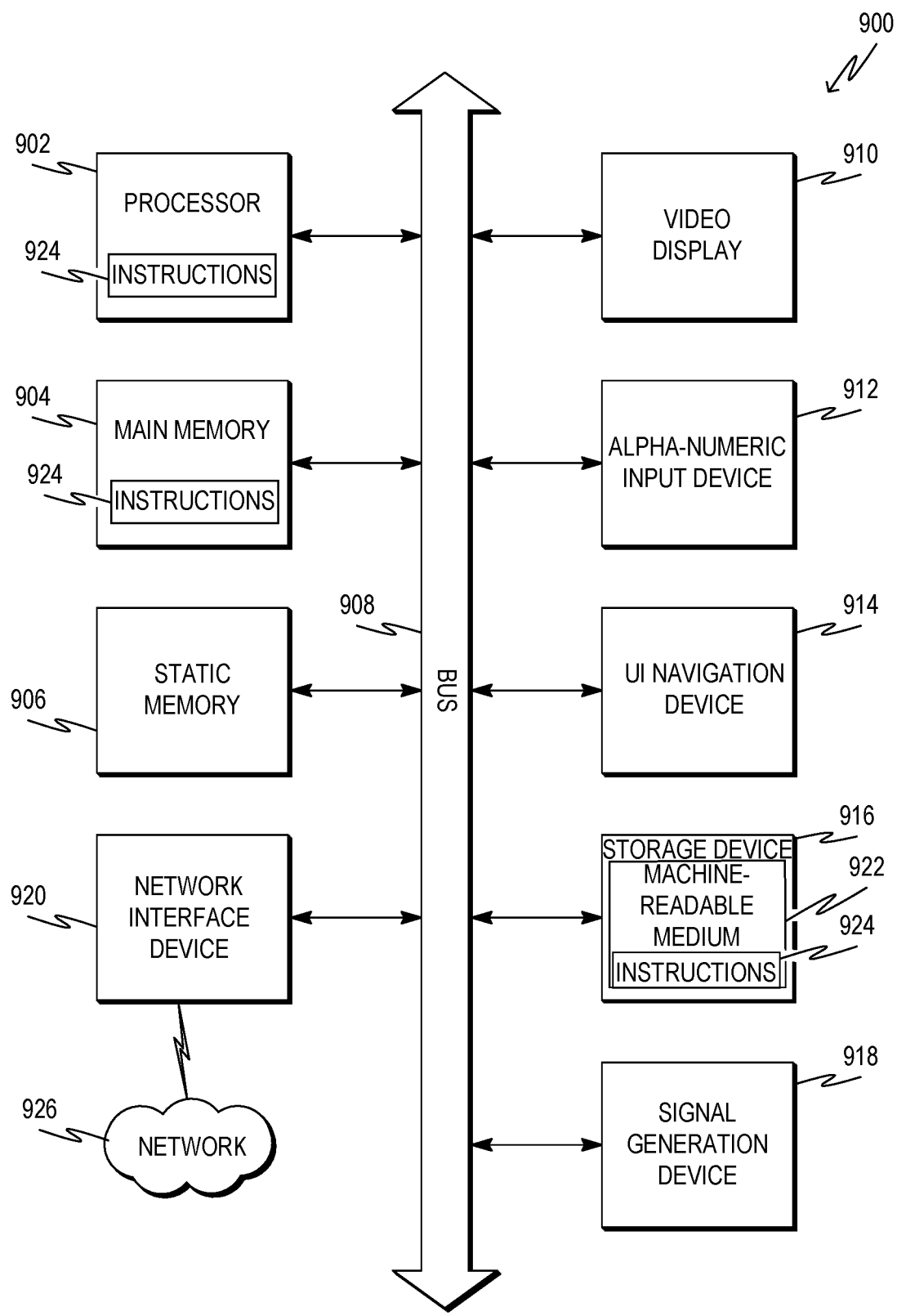
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1 is a method, comprising: sending, by a first computing component to a second computing component, tree generation data for generating a coding tree, wherein the tree generation data comprises string selection data identifying a set of at least two strings of a string library, and wherein the first computing component is executing at a processor unit in communication with a memory; generating, by the first computing component, the coding tree, based at least in part on the tree generation data and the string library; encoding, by the first computing component, a first message based at least in part on the coding tree to generate a first encoded message; and sending, by the first computing component, the first encoded message to the second computing component.

In Example 2, the subject matter of Example 1 optionally includes wherein the coding tree comprises a plurality of nodes and a plurality of edges, wherein a first edge of the plurality of edges is directed from a root node of the plurality of nodes to a second node of the plurality of nodes, wherein the first edge is associated with a first edge string, wherein the first message comprises a plurality of ordered message symbols, and wherein encoding the first message comprises: determining, by the first computing component, that a first message symbol of the plurality of ordered message symbols is equivalent to a first edge symbol of the first edge string; and writing, by the first computing component and to the first encoded message, a first edge indicator corresponding to the first edge.

In Example 3, the subject matter of Example 2 optionally includes wherein encoding the first message further comprises: determining, by the first computing component, that a second edge symbol of the first edge string positioned after the first edge symbol is not equivalent to a second message symbol of the plurality of ordered message symbols positioned after the first message symbol; and writing, by the first computing component and to the first encoded message, a partial edge indicator associated with the first edge indicator.

In Example 4, the subject matter of any one or more of Examples 2-3 optionally includes wherein the plurality of nodes comprises a third node, wherein the plurality of edges comprises a second edge directed from the root node to the second node, wherein the second edge is associated with a second edge string, and wherein encoding the first message further comprises: determining, by the first computing component, that a second message symbol that is next after the first message symbol of the plurality of ordered message symbols is equivalent to a second edge symbol of the second edge string; and writing, by the first computing component and to the first encoded message after the first edge indicator, a second edge indicator corresponding to the second edge.

In Example 5, the subject matter of Example 4 optionally includes wherein encoding the first message further comprises: determining, by the first computing component, that no edge strings associated with edges of the plurality of edges that are directed from the second node begin with a symbol equivalent to a second message symbol that is positioned immediately after the first message symbol of the plurality of ordered message symbols; and writing, by the first computing component and to the first encoded message after the first edge indicator, a root symbol indicating the root node.

In Example 6, the subject matter of Example 5 optionally includes wherein the plurality of edges further comprises a third edge directed from the root node, wherein the third edge is associated with a third edge string, and wherein encoding the first message further comprises: determining, by the first computing component, that the second message symbol is equivalent to a third edge symbol of the third edge string; and writing, by the first computing component and to the first encoded message after the root symbol, a third edge indicator corresponding to the third edge.

In Example 7, the subject matter of any one or more of Examples 1-6 optionally includes wherein generating the coding tree comprises: generating, by the first computing component, a first edge of the coding tree directed from a root node of the coding tree to a second node of the coding tree; associating the first edge with a first edge string equivalent to a first string of the set of at least two strings of the string library; and associating a first edge indicator with the first edge.

In Example 8, the subject matter of Example 7 optionally includes wherein generating the coding tree further comprises: determining that a second string of the set of at least two strings of the string library has a common prefix with the first string, wherein the common prefix comprises at least one symbol; setting the first edge string to the common prefix; generating a second edge of the coding tree directed from the second node of the coding tree to a third node; associating the second edge with a second edge string equivalent to a suffix of the first string that does not includes the common prefix; associating a second edge indicator with the second edge; generating a third edge of the coding tree directed from the second node of the coding tree to a fourth node; and associating the third edge with a third symbol set equivalent to a suffix of the second string that does not includes the common prefix.

In Example 9, the subject matter of any one or more of Examples 7-8 optionally includes wherein generating the coding tree further comprises: determining that a second string of the set of at least two strings of the string library does not have a common prefix with the first string; generating, by the first computing component, a second edge of the coding tree directed from the root node of the coding tree to a third node of the coding tree; associating the second edge with a second edge string equivalent to the second string of the set of at least two strings of the string library; and associating a second edge indicator with the second edge.

In Example 10, the subject matter of any one or more of Examples 7-9 optionally includes wherein the first message comprises a plurality of allowable symbols, and wherein the set of at least two strings of the string library comprises at least one string beginning with each of the plurality of allowable symbols.

In Example 11, the subject matter of any one or more of Examples 1-10 optionally includes receiving, from the second computing component, a second encoded message; and decoding the second encoded message based at least in part on the coding tree to generate a second message.

In Example 12, the subject matter of Example 11 optionally includes wherein the coding tree comprises a plurality of nodes and a plurality of edges, wherein a first edge of the plurality of edges is directed from a root node of the plurality of nodes to a second node of the plurality of nodes, wherein the first edge is associated with a first edge string and is described by a first edge indicator, wherein the second encoded message comprises a plurality of ordered encoded message symbols, and wherein decoding the second encoded message comprises: determining that the first edge indicator is equivalent to a first encoded message symbol of the plurality of encoded message symbols; and writing the first edge string to the second message.

In Example 13, the subject matter of Example 12 optionally includes wherein the plurality of edges further comprises a second edge directed from the root node of the plurality of nodes to a third node of the plurality of nodes, wherein the second edge is associated with a second edge string and is described by a second edge indicator, and where decoding the second encoded message further comprises: determining that a second encoded message symbol after the first encoded message symbol is a root symbol; determining that a third encoded message symbol after the second encoded message symbol is equivalent to the second edge indicator; and writing the second edge string to the second message.

In Example 14, the subject matter of any one or more of Examples 11-13 optionally includes wherein the coding tree comprises a plurality of nodes and a plurality of edges, wherein a first edge of the plurality of edges is directed from a root node of the plurality of nodes to a second node of the plurality of nodes, wherein the first edge is associated with a first edge string and is described by a first edge indicator, wherein the second encoded message comprises a plurality of ordered encoded message symbols, and wherein decoding the second encoded message comprises: determining that the first edge indicator is equivalent to a first encoded message symbol of the plurality of encoded message symbols; determining that a second encoded message symbol modifying the first encoded message symbol is a partial edge indicator; determining a number of symbols indicated by the partial edge indicator; removing the number of symbols from the first edge string to generate a first partial string; and writing the first partial string to the second message.

Example 15 is a computer-implemented system comprising: a processor unit and a memory in communication with the processor unit, wherein the processor unit is programmed to perform operations comprising: sending, to a second computing component, tree generation data for generating a coding tree, wherein the tree generation data comprises string selection data identifying a set of at least two strings of a string library; generating the coding tree, based at least in part on the tree generation data and the string library; encoding a first message based at least in part on the coding tree to generate a first encoded message; and sending the first encoded message to the second computing component.

In Example 16, the subject matter of Example 15 optionally includes wherein the coding tree comprises a plurality of nodes and a plurality of edges, wherein a first edge of the plurality of edges is directed from a root node of the plurality of nodes to a second node of the plurality of nodes, wherein the first edge is associated with a first edge string, wherein the first message comprises a plurality of ordered message symbols, and wherein encoding the first message comprises: determining, by the first computing component, that a first message symbol of the plurality of ordered message symbols is equivalent to a first edge symbol of the first edge string; and writing, by the first computing component and to the first encoded message, a first edge indicator corresponding to the first edge.

In Example 17, the subject matter of Example 16 optionally includes wherein encoding the first message further comprises: determining, by the first computing component, that a second edge symbol of the first edge string positioned after the first edge symbol is not equivalent to a second message symbol of the plurality of ordered message symbols positioned after the first message symbol; and writing, by the first computing component and to the first encoded message, a partial edge indicator associated with the first edge indicator.

In Example 18, the subject matter of any one or more of Examples 16-17 optionally includes wherein the plurality of nodes comprises a third node, wherein the plurality of edges comprises a second edge directed from the root node to the second node, wherein the second edge is associated with a second edge string, and wherein encoding the first message further comprises: determining, by the first computing component, that a second message symbol that is next after the first message symbol of the plurality of ordered message symbols is equivalent to a second edge symbol of the second edge string; and writing, by the first computing component and to the first encoded message after the first edge indicator, a second edge indicator corresponding to the second edge.

In Example 19, the subject matter of Example 18 optionally includes wherein encoding the first message further comprises: determining, by the first computing component, that no edge strings associated with edges of the plurality of edges that are directed from the second node begin with a symbol equivalent to a second message symbol that is positioned immediately after the first message symbol of the plurality of ordered message symbols; and writing, by the first computing component and to the first encoded message after the first edge indicator, a root symbol indicating the root node.

In Example 20, the subject matter of Example 19 optionally includes wherein the plurality of edges further comprises a third edge directed from the root node, wherein the third edge is associated with a third edge string, and wherein encoding the first message further comprises: determining, by the first computing component, that the second message symbol is equivalent to a third edge symbol of the third edge string; and writing, by the first computing component and to the first encoded message after the root symbol, a third edge indicator corresponding to the third edge.

In Example 21, the subject matter of any one or more of Examples 15-20 optionally includes wherein generating the coding tree comprises: generating, by the first computing component, a first edge of the coding tree directed from a root node of the coding tree to a second node of the coding tree; associating the first edge with a first edge string equivalent to a first string of the set of at least two strings of the string library; and associating a first edge indicator with the first edge.

In Example 22, the subject matter of Example 21 optionally includes wherein generating the coding tree further comprises: determining that a second string of the set of at least two strings of the string library has a common prefix with the first string, wherein the common prefix comprises at least one symbol; setting the first edge string to the common prefix; generating a second edge of the coding tree directed from the second node of the coding tree to a third node; associating the second edge with a second edge string equivalent to a suffix of the first string that does not includes the common prefix; associating a second edge indicator with the second edge; generating a third edge of the coding tree directed from the second node of the coding tree to a fourth node; and associating the third edge with a third symbol set equivalent to a suffix of the second string that does not includes the common prefix.

In Example 23, the subject matter of any one or more of Examples 21-22 optionally includes wherein generating the coding tree further comprises: determining that a second string of the set of at least two strings of the string library does not have a common prefix with the first string; generating, by the first computing component, a second edge of the coding tree directed from the root node of the coding tree to a third node of the coding tree; associating the second edge with a second edge string equivalent to the second string of the set of at least two strings of the string library; and associating a second edge indicator with the second edge.

In Example 24, the subject matter of any one or more of Examples 21-23 optionally includes wherein the first message comprises a plurality of allowable symbols, and wherein the set of at least two strings of the string library comprises at least one string beginning with each of the plurality of allowable symbols.

Example 25 is a machine readable medium having instructions thereon that, when executed by a processor unit, cause the processor unit to perform operations comprising: sending, to a second computing component, tree generation data for generating a coding tree, wherein the tree generation data comprises string selection data identifying a set of at least two strings of a string library; generating the coding tree, based at least in part on the tree generation data and the string library wherein the coding tree comprises a plurality of nodes and a plurality of edges, wherein a first edge of the plurality of edges is directed from a root node of the plurality of nodes to a second node of the plurality of nodes, wherein the first edge is associated with a first edge string; encoding a first message based at least in part on the coding tree to generate a first encoded message wherein the first message comprises a plurality of ordered message symbols; determining, by the first computing component, that a first message symbol of the plurality of ordered message symbols is equivalent to a first edge symbol of the first edge string; writing, by the first computing component and to the first encoded message, a first edge indicator corresponding to the first edge; and sending the first encoded message to the second computing component.

What is claimed is:

1. A method, comprising:
    sending, by a first computing component to a second computing component, tree generation data for generating a coding tree, the tree generation data comprising string selection data, the first computing component being executed at a processor unit in communication with a memory;
    generating, by the first computing component, the coding tree, the coding tree comprising a plurality of nodes and a plurality of edges, the generating of the coding tree comprising:
        using the string selection data to select a set of at least two strings from a string library;
        generating a first edge of the plurality of edges using a first string of the set of at least two strings, the first edge being directed from a root node of the plurality of nodes to a second node of the plurality of nodes;
        associating the first edge with a first edge string, the first edge string being equivalent to the first string;
        determining that a second string of the set of at least two strings has a common prefix with the first string; and
        resetting the first edge string associated with the first edge to the common prefix;
    encoding, by the first computing component, a first message based at least in part on the coding tree to generate a first encoded message, the first message comprising a plurality of ordered message symbols, the encoding comprising:
        determining that the first message comprises a first portion of the first edge string associated with the first edge; and
        writing to the first encoded message an indication of the first portion of the first edge string; and
    sending, by the first computing component, the first encoded message to the second computing component.

2. The method of claim 1, further comprising:
    determining, by the first computing component, that a first message symbol of the plurality of ordered message symbols is equivalent to a first edge symbol of the first edge string;
    writing to the first encoded message a first edge indicator corresponding to the first edge;
    determining that a second edge symbol of the first edge string positioned after the first edge symbol is not equivalent to a second message symbol of the plurality of ordered message symbols, the second message symbol positioned after the first message symbol; and
    writing to the first encoded message a partial edge indicator associated with the first edge indicator.

3. The method of claim 2, wherein the plurality of nodes comprises a third node, wherein the plurality of edges comprises a second edge directed from the root node to the second node, wherein the second edge is associated with a second edge string, and wherein encoding the first message further comprises:
    determining, by the first computing component, that a second message symbol that is next after the first message symbol of the plurality of ordered message symbols is equivalent to a second edge symbol of the second edge string; and
    writing, by the first computing component and to the first encoded message after the first edge indicator, a second edge indicator corresponding to the second edge.

4. The method of claim 3, wherein encoding the first message further comprises:
    determining, by the first computing component, that no edge strings associated with edges of the plurality of edges that are directed from the second node begin with a symbol equivalent to a second message symbol that is positioned immediately after the first message symbol of the plurality of ordered message symbols; and
    writing, by the first computing component and to the first encoded message after the first edge indicator, a root symbol indicating the root node.

5. The method of claim 4, wherein the plurality of edges further comprises a third edge directed from the root node, wherein the third edge is associated with a third edge string, and wherein encoding the first message further comprises:
    determining, by the first computing component, that the second message symbol is equivalent to a third edge symbol of the third edge string; and
    writing, by the first computing component and to the first encoded message after the root symbol, a third edge indicator corresponding to the third edge.

6. The method of claim 1, wherein the generating of the coding tree further comprises associating a first edge indicator with the first edge.

7. The method of claim 6, wherein generating the coding tree further comprises:
    generating a second edge of the coding tree directed from the second node of the coding tree to a third node;
    associating the second edge with a second edge string equivalent to a suffix of the first string that does not include the common prefix;
    associating a second edge indicator with the second edge;
    generating a third edge of the coding tree directed from the second node of the coding tree to a fourth node; and
    associating the third edge with a third symbol set equivalent to a suffix of the second string that does not include the common prefix.

8. The method of claim 6, wherein generating the coding tree further comprises:
    determining that a second string of the set of at least two strings of the string library does not have a common prefix with the first string;

generating, by the first computing component, a second edge of the coding tree directed from the root node of the coding tree to a third node of the coding tree;

associating the second edge with a second edge string equivalent to the second string of the set of at least two strings of the string library; and associating a second edge indicator with the second edge.

9. The method of claim 6, wherein the first message comprises a plurality of allowable symbols, and wherein the set of at least two strings of the string library comprises at least one string beginning with each of the plurality of allowable symbols.

10. The method of claim 1, further comprising:

receiving, from the second computing component, a second encoded message; and decoding the second encoded message based at least in part on the coding tree to generate a second message.

11. The method of claim 10, wherein the coding tree comprises a plurality of nodes and a plurality of edges, wherein a first edge of the plurality of edges is directed from a root node of the plurality of nodes to a second node of the plurality of nodes, wherein the first edge is associated with a first edge string and is described by a first edge indicator, wherein the second encoded message comprises a plurality of ordered encoded message symbols, and wherein decoding the second encoded message comprises:

determining that the first edge indicator is equivalent to a first encoded message symbol of the plurality of ordered encoded message symbols; and writing the first edge string to the second message.

12. The method of claim 11, wherein the plurality of edges further comprises a second edge directed from the root node of the plurality of nodes to a third node of the plurality of nodes, wherein the second edge is associated with a second edge string and is described by a second edge indicator, and where decoding the second encoded message further comprises:

determining that a second encoded message symbol after the first encoded message symbol is a root symbol;

determining that a third encoded message symbol after the second encoded message symbol is equivalent to the second edge indicator; and writing the second edge string to the second message.

13. The method of claim 10, wherein the coding tree comprises a plurality of nodes and a plurality of edges, wherein a first edge of the plurality of edges is directed from a root node of the plurality of nodes to a second node of the plurality of nodes, wherein the first edge is associated with a first edge string and is described by a first edge indicator, wherein the second encoded message comprises a plurality of ordered encoded message symbols, and wherein decoding the second encoded message comprises:

determining that the first edge indicator is equivalent to a first encoded message symbol of the plurality of ordered encoded message symbols;

determining that a second encoded message symbol modifying the first encoded message symbol is a partial edge indicator;

determining a number of symbols indicated by the partial edge indicator;

removing the number of symbols from the first edge string to generate a first partial string; and writing the first partial string to the second message.

14. A computer-implemented system comprising a processor unit and a memory in communication with the processor unit, wherein the processor unit is programmed to perform operations comprising:

sending, by a first computing component to a second computing component, tree generation data for generating a coding tree, the tree generation data comprising string selection data;

generating, by the first computing component, the coding tree, based at least in part on the tree generation data and a string library, the coding tree comprising a plurality of nodes and a plurality of edges, the generating of the coding tree comprising:

using the string selection data to select a set of at least two strings from the string library;

generating a first edge of the plurality of edges using a first string of the set of at least two strings, the first edge being directed from a root node of the plurality of nodes to a second node of the plurality of nodes;

associating the first edge with a first edge string, the first edge string being equivalent to the first string;

determining that a second string of the set of at least two strings has a common prefix with the first string; and resetting the first edge string associated with the first edge to the common prefix;

encoding, by the first computing component, a first message based at least in part on the coding tree to generate a first encoded message, the first message comprising a plurality of ordered message symbols, the encoding comprising:

determining that the first message comprises a first portion of the first edge string associated with the first edge; and writing to the first encoded message an indication of the first portion of the first edge string; and sending, by the first computing component, the first encoded message to the second computing component.

15. The system of claim 14, the operations further comprising:

determining, by the first computing component, that a first message symbol of the plurality of ordered message symbols is equivalent to a first edge symbol of the first edge string;

writing to the first encoded message a first edge indicator corresponding to the first edge;

determining that a second edge symbol of the first edge string positioned after the first edge symbol is not equivalent to a second message symbol of the plurality of ordered message symbols, the second message symbol positioned after the first message symbol; and writing to the first encoded message a partial edge indicator associated with the first edge indicator.

16. The system of claim 15, wherein the plurality of nodes comprises a third node, wherein the plurality of edges comprises a second edge directed from the root node to the second node, wherein the second edge is associated with a second edge string, and wherein encoding the first message further comprises:

determining, by the first computing component, that a second message symbol that is next after the first message symbol of the plurality of ordered message symbols is equivalent to a second edge symbol of the second edge string; and writing, by the first computing component and to the first encoded message after the first edge indicator, a second edge indicator corresponding to the second edge.

17. The system of claim 14, wherein the generating of the coding tree further comprises associating a first edge indicator with the first edge.

18. The system of claim 14, the operations further comprising:
- receiving, from the second computing component, a second encoded message; and
- decoding the second encoded message based at least in part on the coding tree to generate a second message.

19. The system of claim 18, wherein the coding tree comprises a plurality of nodes and a plurality of edges, wherein a first edge of the plurality of edges is directed from a root node of the plurality of nodes to a second node of the plurality of nodes, wherein the first edge is associated with a first edge string and is described by a first edge indicator, wherein the second encoded message comprises a plurality of ordered encoded message symbols, and wherein decoding the second encoded message comprises:
- determining that the first edge indicator is equivalent to a first encoded message symbol of the plurality of ordered encoded message symbols; and
- writing the first edge string to the second message.

20. A non-transitory machine readable medium having instructions thereon that, when executed by a processor unit, cause the processor unit to perform operations comprising:
- sending, by a first computing component to a second computing component, tree generation data for generating a coding tree, the tree generation data comprising string selection data;
- generating, by the first computing component, the coding tree, the coding tree comprising a plurality of nodes and a plurality of edges, the generating of the coding tree comprising:
  - using the string selection data to select a set of at least two strings from a string library;
  - generating a first edge of the plurality of edges using a first string of the set of at least two strings, the first edge being directed from a root node of the plurality of nodes to a second node of the plurality of nodes;
  - associating the first edge with a first edge string, the first edge string being equivalent to the first string;
  - determining that a second string of the set of at least two strings has a common prefix with the first string; and
  - resetting the first edge string associated with the first edge to the common prefix;
- encoding, by the first computing component, a first message based at least in part on the coding tree to generate a first encoded message, the first message comprising a plurality of ordered message symbols, the encoding comprising:
  - determining that the first message comprises a first portion of the first edge string associated with the first edge; and
  - writing to the first encoded message an indication of the first portion of the first edge string; and
- sending, by the first computing component, the first encoded message to the second computing component.

* * * * *